July 17, 1956

J. M. FRANK 2,755,365

PERCUSSION WELDING

Filed Dec. 17, 1951

Inventor,
John M. Frank,
By Schneider & Dressler, Attys.

United States Patent Office 2,755,365
Patented July 17, 1956

2,755,365

PERCUSSION WELDING

John M. Frank, Chicago, Ill., assignor to Fansteel Metallurgical Corporation, a corporation of New York Application December 17, 1951, Serial No. 262,134

14 Claims. (Cl. 219—4)

This invention relates particularly to percussion welding although it may have applications to other types of welding.

Percussion welding involves the generation of heat at the surfaces of two work pieces to be welded and the application of a momentary high pressure upon such work pieces to force them together. As a rule, percussion welding apparatus includes means for carrying the two work pieces to be welded and for moving one of the work pieces toward the other. The two work pieces are connected to a charged condenser and the condenser potential is sufficiently high so that first a spark and then an arc are generated while the pieces are approaching each other. The arc heats parts of the work pieces and while they are hot, the parts meet and the force of meeting aids in welding.

The above process involves the ionization of air or other gases in the gap and the generation of an arc. The same condenser is used for both. It is well known that, apart from the condenser potentials, the mechanism of ionization is affected by the geometry of the opposed electrode surfaces, this, of course, determining the nature of the electric field, and also the nature and condition of the electrode surfaces, as well as the ion content of the air or other gases in the electrode gap. It is apparent, therefore, that ionization and initiation of the arc are usually functions of the spacing between the work pieces in percussion welding apparatus, the other factors itemized above being, to a substantial degree, uncontrollable and erratic. The arc duration, at its maximum, will be determined by the time when the work pieces contact each other and frequently extinguishing of the arc occurs substantially earlier than percussive contact of the work pieces. Hence, in order to have the percussive contact of the work pieces occur during or right after the arc period, thus reducing the time between extinguishing of the arc and percussive contact, it has been necessary to move the work pieces toward each other at a sufficiently high speed to accomplish this. Any attempt to control arc duration by varying the potential to which the condenser is charged results in a change of time of arc initiation with reference to the separation of electrode surfaces. Increasing condenser capacitance is costly and frequently is not possible. Increasing the speed of movement of the work piece raises problems incident to absorbing the shock of impact when the parts meet.

A complete welding cycle in a percussive welder may be divided into electrical and mechanical phases. The electrical phase of the welding cycle may be divided into the generation of a high potential between spaced electrode surfaces for ionization and the subsequent creation of the arc. The arc is extinguished when the potential at the condenser plates is too low to support the arc.

The ionization part usually has a duration of the order of about one microsecond, although this may vary to some extent, depending upon the potential gradient and electrode spacing. The arc itself immediately follows the ionization of the arc path. Once the arc has been initiated, the duration is determined by the capacitance of the condenser, the potential to which the condenser is charged, the resistance of the discharge path and the value of any inductance present in the arc current circuit. In practical welders, the arc duration may range from about one hundred microseconds up to about five hundred microseconds, depending upon the nature of the work, speed of travel of the pieces to be welded, current intensity, and the like.

The mechanical phase of the welding cycle may be divided into the initiation of movement of one work piece toward the other, the acceleration of the parts toward each other, the initial spacing between the parts at the start of the cycle and the end of the travel when the parts meet. The duration of the percussive force, generated at the time that the parts meet, is generally small as compared to arc duration.

For good welding, it is of the utmost importance that timing of both electrical and mechanical phases of the welding cycle be precise and be susceptible to precise control. If the arc duration causes the arc to be extinguished too early, with respect to the instant when the parts meet, then a "cold" weld having little strength results. In many instances, and depending upon the physical size and heat transmitting properties of the work, it may be desirable to adjust the initiation and duration of the arc independently of the physical factors in the mechanical phase of the welding cycle.

In so far as I am aware, percussive welders have not hitherto been provided with means for proper control and adjustment of timing between the electrical and mechanical phases of a percussive welder. Consequently, percussive welding of different metal combinations, such as tantalum on the one hand and tungsten, nickel, copper, silver, columbium or molybdenum on the other hand, and between combinations of the same metals, such as tantalum-tantalum, tungsten-tungsten, nickel-nickel, etc., has not been satisfactorily accomplished. As a rule, some welders may be good for certain types of work and other welders may be good for other types of work. No welders, however, have been satisfactory for all-around types of work.

I have found that the quality of a weld and the ability to produce a weld in different metals has been greatly improved because of control of the various factors governing the production of a weld. These factors are: the timing between the mechanical and electrical phases of a welding cycle, the intensity of arc discharge, the duration of the arc and the amount of percussive force applied to the weld.

I have succeeded in eliminating the disadvantages and drawbacks of conventional welders by separating the ionizing and arc maintaining parts of the system.

In accordance with this invention, I have provided a normally inactive generator of high frequency, high potential electric waves connected to the work pieces. The output of this generator, when active, is sufficient to ionize intensely any electrode separation which may normally exist between work pieces. Means are provided for activating this generator at a proper time in relation to the travel of one work piece toward the other. There is also provided a condenser which, when charged, has sufficient energy to generate an intense arc between the work pieces, after the electrode gap has been ionized. An electronic switch is provided for controlling the discharge circuit of said condenser so that when said switch is on or closed, said condenser may discharge through the electrode gap, providing said electrode gap is ionized. Means are also provided for closing said electronic switch in proper phase relation to the activation of said high frequency generator so that the arc discharge occurs in proper sequence with the ionization of the air and/or other gases in the gap.

The means for activating the high frequency generator may consist of an electronic switch.

For precise control of the generator and arc maintaining condenser, it is preferred to generate electrical trigger pulses in proper relation to the work piece movement and have these trigger pulses initiate generator action and throw the electronic switch on for arc current. The electronic switch in the arc current circuit is necessary so that the ionizing potential will not be absorbed in the arc maintaining condenser.

Instead of a normally inactive generator of high frequency, high potential waves, it is possible to use an active generator and switch the connections from the output to the work pieces. This, however, involves difficulties in switching and in general is less desirable.

Specifically, one system embodying the present invention has one condenser where energy may be stored solely for the maintenance of an arc, as distinguished from the initiation thereof. Another condenser is provided for storing energy for initiating the arc. This latter condenser may have a comparatively low capacitance as compared with the first condenser. The arc maintaining condenser itself, while having a large capacitance, need not necessarily be of the high potential type. This is based upon the fact that once an arc is established, a comparatively low potential is required to maintain the same. Furthermore, means are provided for interlocking and combining the action of the two circuits containing the condensers whereby an intense discharge may be initiated.

Means have also been provided for controlling the exact timing of arc initiation and also for controlling the duration of the discharge. The initiation and maintenance of the arc are substantially independent of the relative electrode position. Thus, the percussive factor in welding is rendered completely independent of the generation and maintenance of the arc. Accordingly, it is now possible to adjust the mechanical parts for moving the work pieces toward each other to an optimum value for desired work and, independently, to adjust the timing and duration of the arc discharge for obtaining satisfactory welding.

In order that the invention may be understood, a block diagram and an exemplary circuit embodiment thereof will now be described, it being understood that variations may be made therein without departing from the spirit of the invention or the scope thereof.

Referring now to the drawings.

Figure 1:
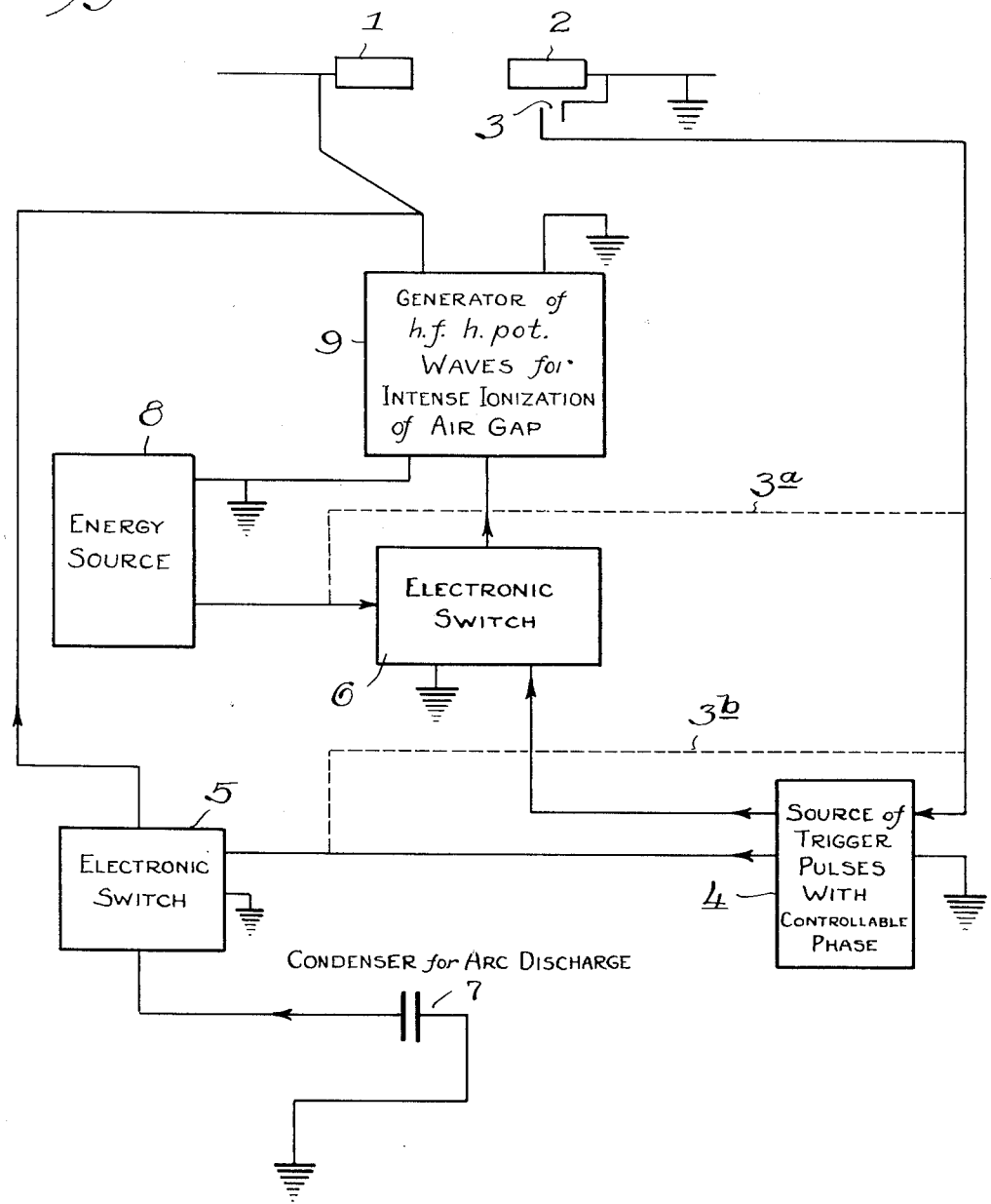
Figure 1 shows a block diagram illustrating the invention generally.

Referring first to Figure 1, work pieces 1 and 2 are carried by suitable means in a percussion type welder of conventional design. These work pieces are to be welded together and are carried by suitable supports not shown. Either or both of the work pieces are adapted to be moved so that the work pieces come together. For convenience, work piece 2 will be considered as the movable work piece with respect to 1.

Associated with work piece 2 in any suitable manner, such as by a common support, is electric switch 3 of any desired construction. This switch, as is shown diagrammatically, is adapted to be closed when work piece 2 has completed a predetermined part of its travel toward 1. The switch may consist of fine wires or metal leaves and may be provided with suitable means for adjusting the point of contact closure with respect to the point of travel of work piece 2. It is immaterial whether switch 3 remains closed for the remainder of the travel of work piece 2, or opens. The only requirement is that the switch be closed for a brief instant of time at a predetermined point of travel of work piece 2, and that such predetermined point shall be adjustable by an operator within desired limits.

It will be noted that work piece 2 is grounded and that switch 3 connects to ground whatever apparatus is connected to the high side of this switch.

Switch 3 is connected to pulse generator 4 of any desired type. Pulse generator 4, for example, may be a biased multi-vibrator or a blocking oscillator for generating one or a number of sharp pulses. It is understood that the closure of switch 3 will cause pulse generator 4 to operate. Pulse generator 4 is connected to electronic switches 5 and 6, respectively. The electronic switches are space discharge electronic devices capable of carrying substantial current. These swtches are of the type which are normally open, but which are closed by an electric pulse and when closed will remain in that position until the current passed by the switch stops, after which the switch reverts to its open condition. Thus, a grid-controlled gaseous discharge device presently available commercially is one example of such a switch.

Electronic switch 5 has one terminal of the output of the switch connected to work piece 1, while the other terminal is connected to grounded condenser 7. Condenser 7 has energy stored therein for maintaining an arc to be generated between the work pieces during a welding cycle.

Electronic switch 6 controls a circuit, including energy source 8 and generator 9, for producing high frequency, high potential electric waves. The output of generator 9 is connected to the work pieces and the potential and frequency of this generator is such that intense ionization of the air gap between the work pieces is produced whenever the generator is active. Generator 9 is normally inactive and is adapted to become active when energy source 8 is connected thereto. Energy source 8 may consist of a charged condenser, a battery, or any suitable source of potential and current. Generator 9 may consist of any suitable oscillating circuit for generating a high frequency, high potential wave. Thus, a spark gap and transformer arrangement may be used, or a transformer system alone may be used. In the latter case, the sudden closure of the circuit by the electronic switch will suffice to initiate oscillations.

It is not necessary that generator 9 have continuous waves in the output. As long as a high frequency, high potential train of waves is generated for several microseconds for ionizing the air gap, no additional waves will be required. Generator 9 may also consist of a vacuum tube oscillator system. Inasmuch as generators of both continuous and damped wave trains are well known, a detailed description thereof will not be given in connection with this figure.

Pulse generator 4 may include means for adjusting the phase of pulses to electronic switches 5 and 6. Thus, by proper design and operation of the system, a welding cycle will be initiated when work piece 2 starts to move toward piece 1.

When the switch controlled by the movement of the work piece, or the movement of the support holding the work piece, is closed, the two electronic switches will be closed in proper timed relation. First, electronic switch 6 will cause high frequency, high potential waves to appear across the work pieces and ionize the air gap and cause a spark to jump between them. Then, condenser 7 will discharge through a circuit, including switch 5, and the spaced work pieces to generate and maintain an arc therebetween.

It is possible to eliminate electronic switch 6 and pulse generator 4, if desired. Thus, dotted line connection 3a by-passes electronic switch 6. Hence, the closure of switch 3 will immediately close a circuit for initiating operation of generator 9. By providing connection 3b, pulse generator 4 is eliminated as far as triggering of electronic switch 5 is concerned.

Electronic switch 5 is essential for the reason that a fast acting heavy duty switch is necessary. Mechanical switches are not suitable for the purpose at hand, since timing down to microseconds is required. By controlling the time of closure of electronic switch 5, with respect to the initiation of ionization in the air gap, effective arc control is possible. If electronic switch 5 is eliminated and condenser 7 is connected across the gap, then condenser 7 will prevent the build-up of a high potential, high frequency across the air gap and thus make ionization a practical impossibility.

Figure 2:
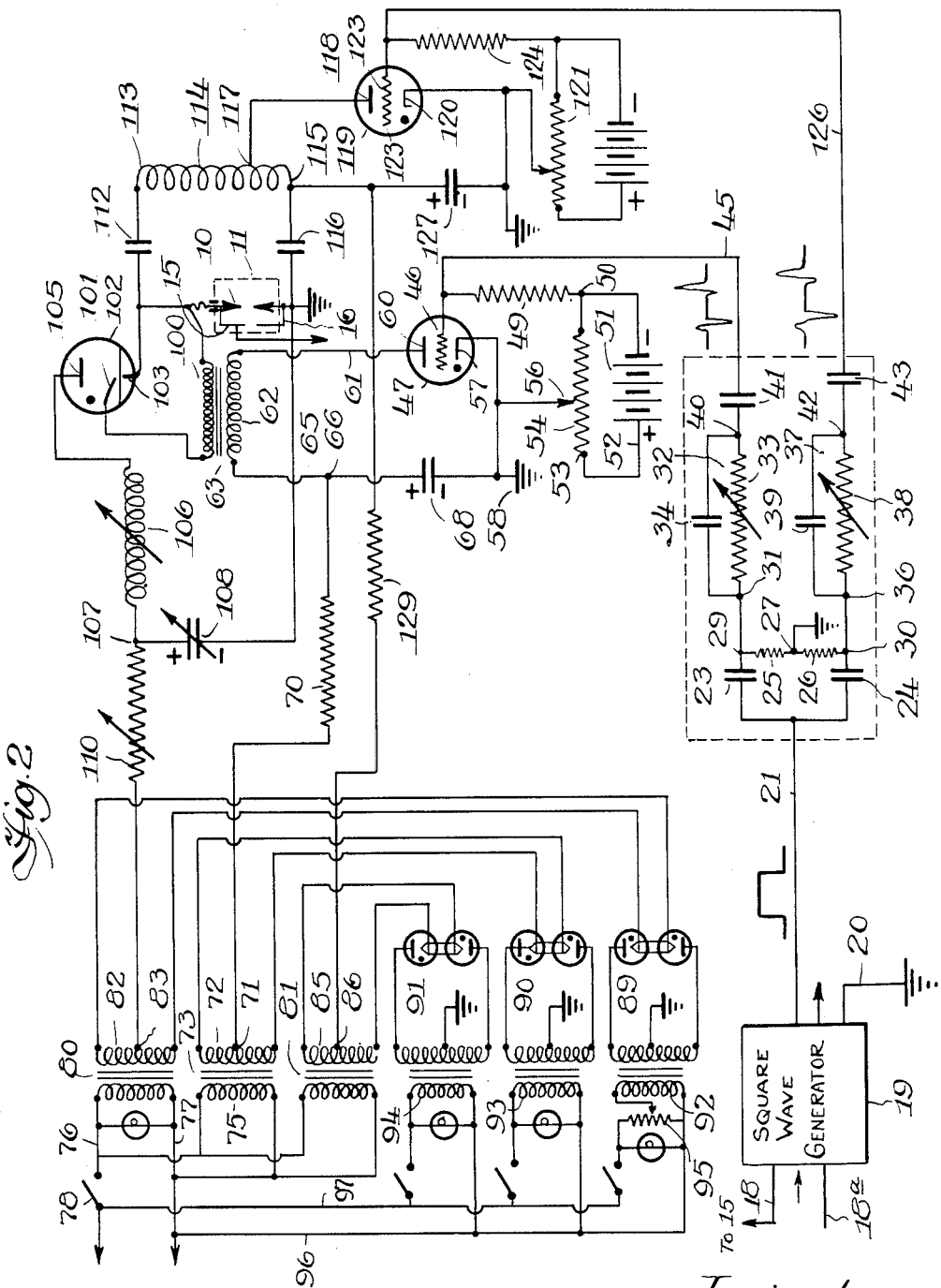
Figure 2 shows a circuit illustrating the invention together with a diagrammatic showing of the electrode arrangement.

Referring now to Figure 2, a complete system embodying the invention will be described.

The invention may be used with any type of percussion welder and since such welders are old, a showing of a complete welder is not deemed to be necessary. For the purposes at hand, the drawing shows a representation of a movable work piece 10 and of a fixed work piece 11. The support for piece 10 carries movable contact 15 adapted to cooperate with grounded fixed contact 16. One or both of these contacts is provided with suitable means, such as screw and nut adjustments, for controlling the contact separation and contact action with reference to the position of piece 10.

Movable contact 15 is connected by wire 18 to square wave generator 19. This generator may be a multivibrator or similar device and is made to operate by closure of contacts 15 and 16. The input circuit for generator 19, containing wires 18 and 18a and contacts 15 and 16, may include a source of energy if that is necessary. Inasmuch as only one square wave is necessary to initiate a welding cycle, even a battery and switch may suffice. Generator 19 has its output connected to wires 20 and 21. The generator polarity is such that positive square waves are available. Wire 21 is connected to one terminal of each of condensers 23 and 24. The other terminals of these condensers are connected through resistors 25 and 26 to grounded terminal 27. Condenser 23 and resistor 25 on one hand, and condenser 24 and resistor 26 on the other hand, form two differentiating circuits. As is well known, such circuits have a low time constant.

The combination of square wave generator 19 and a differentiating circuit is for the purpose of generating a single positive pulse having comparatively steep sides and short duration of the order of a microsecond. Inasmuch as only a positive pulse is to be used in the remainder of the system, it is immaterial whether a succeeding negative pulse is generated or not. For precise timing, the first differentiated pulse should be positive. Hence, positive square waves are preferred. The repetition rate of the square wave generator, or if one wave only is generated then the speed of operation of the generator, should be great enough so that accurate timing, when contacts 15 and 16 touch, is possible. The degree of timing precision will depend upon how fast the work pieces are approaching when the contacts close and how critical this part of the cycle is. In general, a timing accuracy of 5 to 10 microseconds is readily available.

The differentiating circuits have terminals 29 and 30 which may be considered as the high potential output terminals of these circuits. Thus, terminal 29 is connected to terminal 31 of a network generally indicated by numeral 32 and consisting of variable resistor 33 and shunt condenser 34. This network is a phase control network and is provided for the purpose of controlling the time delay of a pulse. Other networks or delay lines may be used as required. The delay period, to be introduced by a network, is generally short and is of the order of a microsecond.

Similarly, terminal 30 of the lower differentiating circuit is connected to terminal 36 of delay network 37. This delay network consists of variable resistor 38 shunted by condenser 39. It is understood that the condenser may be variable in these delay networks instead of the resistor. However, since the values of the condensers are very small, generally in the order of micro-microfarads, and since accurately calibrated variable resistors are readily available, the arrangement disclosed is satisfactory.

Network 32 has output terminal 40 connected to coupling condenser 41, while network 37 has output terminal 42 connected to coupling condenser 43.

Coupling condenser 41, which preferably has a very small capacitance, since it must transmit a sharp pulse, is connected by wire 45 to control electrode 46 of gas discharge tube 47. Gas discharge tube 47 may be a thyratron or similar grid-controlled gas discharge tube available on the market. While such tubes may have either hot or cold cathodes, it is preferred to use the hot cathode type of tube to avoid ionization time delay. Suitable means for heating the cathode is provided.

Gas discharge tube 47 has its control grid 46 connected through grid resistor 49 to terminal 50. Terminal 50 is connected to the negative terminal of a source of constant bias potential 51, such source either being a battery, as shown, or being a suitable rectified potential. Potential source 51 has its positive terminal 52 connected to terminal 53 of resistor 54, forming part of a potentiometer. Resistor 54 has its other terminal connected to terminal 50 and cooperates with wiper 56 connected to cathode 57 of the gas tube. The cathode of the tube is grounded at 58.

Gas discharge tube 47 has anode 60 connected by conductor 61 to one terminal of primary 62 of transformer 63. This transformer, as shown, has an iron core and is preferably of the so-called pulse type. Such a transformer has a comparatively low inductance and low distributed capacitance with a wide frequency band characteristic and will operate in pulsing circuits. Primary 62 is connected by conductor 65 to terminal 66 and to one terminal of condenser 68. The other terminal of condenser 68 is grounded as shown.

It is understood that potentiometer wiper 56 is adjusted so that the bias of control grid 46 of gas tube 47 is below the firing potential, when condenser 68 is fully charged from a circuit which will now be described. It is also understood that a positive pulse when supplied from differentiating terminal 29 will suffice to momentarily elevate the potential of control grid 46 of the gas tube to permit firing.

Referring now to terminal 66, resistor 70 has one terminal connected to terminal 66 and the other terminal connected to center tap 71 of secondary winding 72 of transformer 73. Transformer 73 has primary 75 connected to power lines 76 and 77 going to a conventional 60 cycle line. Switch 78 is provided for controlling the power input to a number of transformers to be described. Thus, transformers 80 and 81 have their primaries supplied from line wires 76 and 77. Transformer 80 has secondary 82 center tapped at 83, while transformer 81 has secondary 85 center tapped at 86. Secondaries 82, 72 and 85 have their terminals connected, respectively, to rectifying systems 89, 90 and 91. As shown, these rectifiers are of the full wave type, each rectifier system having the corresponding transformer winding center tapped and grounded. Rectifying systems 89, 90 and 91 may be of any type, and the transformers for supplying current and potential thereto include primaries 92, 93 and 94. Primary 92 is provided with variable resistor 95 for the purpose of controlling the potential available at winding 92. Otherwise, primaries 92, 93 and 94 are connected to supply lines 96 and 97 and are provided with individual switches and indicating lights.

It is understood that the charging circuit for condenser 68 is completed through transformer secondary 72, rectifier system 90 and ground. The time constant of the charging circuit is preferably of the order of about $\frac{1}{10}$ second. This, however, may vary widely, depending upon how fast the welding cycles are to follow. The charging circuit cannot maintain the condenser potential above that necessary to maintain a discharge through gas tube 47. The discharge through tube 47 will therefore extinguish itself.

Referring now to transformer 63, secondary 100 thereof has one terminal connected to igniter electrode 101 of mercury pool ignitron 102. Ignitron 102 has mercury pool cathode 103 connected to the other terminal of secondary 100 and is also provided with a connection to movable electrode 10 of the percussion welder. Ignitron 102 has anode 105 connected through variable inductance 106 to terminal 107. Between terminal 107 and ground is connected one or more condensers 108. This condenser provides the welding current and must, therefore, have sufficient capacitance at a suitable potential. The size of this condenser will depend upon the welding load. Condensers or banks of condensers, having capacitances of hundreds and even thousands of microfarads, may be required. Ignitron 102 will have sufficient current-carrying capacity to handle the welding current. Igniter electrode 101 normally takes on a negative charge and prevents space current from flowing. It may be negatively biased by a battery or other source of potential.

Terminal 107 is connected through variable resistor 110 to center tap 83 of its charging circuit. Electrode 11 of the welder is grounded and thus is connected to the negative terminal of condenser 108. Condenser 108 is shown as being variable merely for the purpose of indicating that the amount of capacitance required will vary with the load. In practice, fixed condensers and suitable switching means for increasing or decreasing the number of condensers used will be provided. Resistor 110 is variable in order to determine the time constant of the charging circuit. In general, a time constant equal to that for condenser 68 is desirable.

Referring now to cathode 103 of ignitron 102, a connection goes from this electrode through coupling condenser 112 to terminal 113 of autotransformer 114. Autotransformer 114 has its lower terminal 115 connected to ground through coupling condenser 116. Autotransformer 114 has intermediate tap 117 connected to anode 118 of thyratron tube 119. Tube 119 has cathode 120 connected to ground and also connected to a biasing circuit 121 generally resembling the circuit for biasing control electrode 46 of tube 47. Tube 119 has control electrode 123 connected through grid resistor 124 to the negative terminal of source 121 of bias potential. The output of delay network 37 is connected through coupling condenser 43 and wire 126 to control grid 123 of tube 119. Condenser 127 is connected between ground and terminal 115 of autotransformer 114. Terminal 115 is also connected through limiting resistor 129 to center tap 86.

The operation of the system is as follows: Assuming that the various rectifier systems are energized and that the various condensers have been charged, the welding operation is initiated by an operator in a conventional fashion. Upon the closure of contact 15 against 16, a square wave or steep potential wave front is generated and a positive pulse appears at terminals 29 and 30 of the differentiating circuits. These pulses are transmitted through the networks to control grids 46 and 123, respectively. These pulses are positive and result in tubes 47 and 119 firing. When tube 119 fires, condenser 127 will discharge through this tube and through the primary of autotransformer 114, this consisting of the part of the windings between terminals 115 and 117. The autotransformer is of the air core type. The oscillatory discharge generates a sufficiently high potential in the secondary so that a high potential appears across electrodes or work pieces 10 and 11. The potential across the electrodes is sufficiently high to ionize intensely the gas or gases in the electrode space of any reasonable electrode separation.

At the time that tube 119 discharges, tube 47 fires and permits condenser 68 to discharge through transformer primary 62 and the tube. The oscillatory potential generated in secondary 100 is sufficiently high to cause ignitron 102 to fire and complete an arc circuit. The timing should be such that the discharge of condenser 108 through the circuit, including ignitron 102 and the welding load, occurs as the aftermath of the intense ionization of the gases at the welding gap. Inductance 106 may be adjusted so that intensity and duration of the arc discharge is as desired.

As an example, condensers 68 and 127 may have capacitances, respectively, of about 10 mf. and 1 mf. The potentials to which these condensers are charged will depend upon transformer ratios. However, in practice, these condensers may operate at about 1,000 volts and have charging time constants of about $1/10$ second. This charging time may also be true of condenser 108. Inductor 106 will have a comparatively small value. Thus, a value of the order of about 50 to 100 microhenries will be ample. This may be varied to control arc duration. The ionization potential at the electrodes may be about 50,000 volts.

It will be thus seen that the discharge circuit for condenser 127 and the secondary circuit for the air core transformer, constitutes a generator of high frequency, high potential electric waves. This generator is normally inactive, but is rendered active by thyratron 47 becoming conducting. This thyratron thus constitutes an electronic switch. The output of the generator is sufficient to ionize intensely the gases in any gap which will normally exist between the work pieces in a percussion welding cycle.

Condenser 108 may also be considered as being connected to the work pieces through an electronic switch, this being an ignitron for heavy duty work. It is clear, that the electronic switch for condenser 108 is activated to the closed position in proper phase relation to the activation of the high frequency generator. Thus, the high frequency generator first ionizes the gases in the welding space after which an arc discharge from condenser 108 follows.

The electronic switch for activating the high frequency generator is triggered or thrown on in timed relation to the spacing between the work pieces.

Because of the precise control of the discharge as well as the timing and duration it is possible to weld metals which are difficult, if not impossible, to weld with prior percussion welders. Thus, I have successfully welded tantalum to tungsten, or nickel, or copper, or tantalum. Welds between tantalum and copper-plated nickel as well as between copper and silver, copper and copper, molybdenum and molybdenum, and combinations of molybdenum, tungsten, tantalum, nickel, steel alloys and other metals, are all possible in accordance with my invention.

What is claimed is:

1. In a percussion welding system, the combination of a generator of high frequency, high potential electric waves, means responsive to a predetermined work piece spacing for impressing the output from said generator on spaced work pieces to be welded, the output of said generator being sufficient to ionize intensely the gas or gases in the gap between said work pieces to prime same for an arc discharge, a condenser for storing current to be discharged in an arc between the work pieces, means including a normally open electronic switch for connecting said condenser to said work pieces and means for closing said electronic switch a predetermined time after said generator output has been impressed across said work pieces when said gas-filled gap is intensely ionized, whereby an accurately predetermined condenser discharge between said work pieces will result.

2. In a percussion welding system having work pieces to be welded, traveling toward each other during a welding cycle, the combination of a generator of high frequency, high potential electric waves, means including an electronic switch for impressing the output of said generator upon said work pieces at a predetermined position of said work pieces during their period of approach, the output of said generator being sufficient to ionize intensely the gas or gases in the gap between said work pieces to prime same for an arc discharge, a condenser for storing sufficient energy to maintain an arc across said work pieces during the time that they are separated, a normally open electronic switch and circuit connecting said last-named condenser to said work pieces, and means for closing said last named electronic switch in proper phase after said first named electronic switch so that an arc discharge may occur in accurately timed relation to the work piece movement and independently of ionization initiation conditions but after the occurrence of ionization in said gas-filled gap.

3. In a percussion welding system, the combination of a normally inactive generator of high frequency, high potential electric wave connected to work pieces to be welded, means responsive to a predetermined work piece spacing for energizing said generator to activity, the output of said generator being sufficient to ionize intensely the gas or gases in the gap between said work pieces to prime same for an arc discharge, a condenser for storing current to be discharged in an arc between the work pieces, means including a normally open electronic switch for connecting said condenser to said work pieces and means for closing said electronic switch in proper phase after said generator has been activated when said gas-filled gap is intensely ionized, whereby an accurately predetermined condenser discharge between said work pieces will result.

4. In a percussion welding system having work pieces to be welded, traveling toward each other during a welding cycle, the combination of a normally inactive generator of high frequency, high potential electric waves connected across said work pieces, means including an electronic switch for activating said generator at a predetermined position of said work pieces during their period of approach, the output of said generator being sufficient to ionize intensely the gas or gases in the gap between said work pieces to prime same for an arc discharge, a condenser for storing sufficient energy to maintain an arc across said work pieces during the time that they are separated, an electronic switch and circuit connecting said last named condenser to said work pieces, and means for closing said last named electronic switch in proper phase following the activation of said generator by said first named electronic switch so that an arc discharge follows immediately the ionization in said gas-filled gap.

5. In a percussion type welding system having two work pieces between which there is a gas-filled gap at the beginning of a welding cycle, said work pieces being moved toward each other and having an arc discharge therebetween prior to the meeting of said work pieces so that said work pieces may be welded when they meet, the combination of electric switch means, means for operating said switch means at a predetermined work piece separation, three circuits, each circuit having the cathode and anode of an electron discharge device connected thereto so that the space discharge path forms part of a circuit, each such discharge device having a control electrode, said three circuits each having a condenser in series with the space discharge paths of the respective tubes, charging circuits for said condensers, the first and second circuits also including transformer primaries, means for biasing the control electrodes of the discharge devices for the first and second circuits to cutoff, said condensers being adapted to discharge through said devices in said first and second circuits when the control electrode potential for each device rises above cutoff, the transformer for the first circuit having a secondary, connections disposing said secondary across the work pieces, said third circuit having connections disposing said pieces therein so that the gas-filled gap between said work pieces forms part of the third circuit, the transformer for the second circuit having a secondary, means for connecting said last named secondary between the cathode and control electrode of the third circuit discharge device, the discharge device for said third circuit being of the gaseous discharge type, the transformer secondary for the first circuit transformer having a sufficiently high step-up ratio to ionize the gas-filled gap to prime same for an arc discharge, the second circuit discharge causing the secondary to raise above cutoff the potential of the control electrode of the third circuit of the discharge device and permit the third circuit condenser to discharge through the gaseous discharge device and through the ionized gas-filled gap and means controlled by the operation of said switch for generating potential pulses for triggering the electron discharge devices of the first and second circuits.

6. In a percussion type welding system having two work pieces between which there is a gas-filled gap at the beginning of a welding cycle, said work pieces being moved toward each other and having an arc discharge therebetween prior to the meeting of said work pieces so that said work pieces may be welded when they meet, the combination of electric switch means, means for operating said switch means at a predetermined work piece separation, three circuits, each circuit having the hot cathode and anode of a gas discharge device connected thereto so that the space discharge path forms part of the circuit, each gaseous discharge device having a control electrode, a condenser in series with the space discharge path of each of the respective tubes, charging circuits for said condensers, the first and second circuit also including transformer primaries, means for biasing to cut off the control electrode of the discharge device in the first and second circuits respectively, said condensers being adapted to discharge through said devices in said first and second circuits when the potential for the control electrode for each device rises above cutoff, the transformer for the first circuit having a secondary, connections disposing said secondary across the work pieces, said third circuit having connections disposing said work pieces therein so that the gas-filled gap between said work pieces forms part of the third circuit, the transformer for the second circuit having a secondary, means for connecting said last named secondary between the cathode and control electrode of the third circuit discharge device, the transformer secondary for the first circuit transformer having a sufficiently high step-up ratio to ionize intensely any gas or gases in the gap between the work pieces to prime same for an arc discharge, the second circuit discharge being adapted to cause the secondary to raise above cutoff the potential of the electrode of the third circuit discharge device and permit the third circuit condenser to discharge through the device and through the gas-filled gap and means controlled by the operation of said switch for raising the potentials of the control electrodes of the gaseous discharge devices for the first and second circuits in timed relation whereby an intense discharge between the work pieces may be provided at a predetermined part of the travel cycle.

7. The system according to claim 6 wherein inductance means are provided in the third circuit for controlling the discharge of the condenser in said third circuit.

8. The system according to claim 6, wherein said means controlled by said switch operation includes means for generating two positive pulses, circuit means for supplying said pulses to the control electrode of the gaseous discharge devices in said first and second circuits respectively and means for delaying one pulse relatively to the other, whereby the two discharge devices will become conducting in properly timed relation.

9. In a percussion type welding system having two work pieces between which there is a gas-filled gap at the beginning of a welding cycle, said work pieces being moved toward each other and having an arc discharge therebetween prior to the meeting of said work pieces so that said work pieces may be welded when they meet, the combination of electric switch means, means for operating said switch means at a predetermined work piece separation in the course of travel of one work piece toward the other, three circuits, the first two circuits having thyratrons of the hot cathode type, the cathode and anode of said thyratrons and space discharge paths forming part of the respective circuits, the third circuit having an ignitron with the space discharge path between the cathode and anode forming part of the third circuit, a condenser in series with the space discharge path of each of the gas discharge devices in said three circuits, charging circuits for said condensers, the first and second circuits also including transformer primaries, means for biasing the thyratron control electrodes to cutoff, said condensers being adapted to discharge through said thyratrons when the potential of each control electrode rises above cutoff, the transformer for the first circuit having a secondary, connections disposing said secondary across the work pieces, said third circuit having connections disposing said work pieces therein so that the gas-filled gap between said work pieces forms part of the third circuit, the transformer for the second circuit having a secondary, means for connecting said last named secondary between the cathode and control electrode of the ignitron, the transformer secondary for the first circuit transformer having a sufficiently high step-up ratio to ionize intensely any gas or gases in the gap between the work pieces to prime same for an arc discharge, the second circuit discharge causing the secondary to initiate a discharge through the ignitron, said discharge also going through the ionized gas-filled gap and means operated by said switch for generating positive electrical pulses and means for feeding said pulses to said thyratron control electrodes in proper phase whereby said various gaseous discharge devices become conducting to ionize the gas-filled gap and cause an arc to heat the work pieces prior to percussion.

10. The system according to claim 9, wherein the transformer for the first circuit is of the air core type.

11. The system according to claim 9, wherein said pulse generating means includes means for generating an electrical wave having a steep wave front and means for differentiating said wave front to produce trigger pulses.

12. In a percussion welding system a combination of a first source of electrical energy for ionizing the gaseous medium between pieces of metal to be welded to prime same for an arc discharge, the edges of said pieces to be welded being spaced initially a predetermined distance apart, a second source of electrical energy for generating an electrical arc between the separated pieces of metal to be welded when the space therebetween is ionized, a first switch means for coupling the output of said first source of electrical energy across the pieces of metal to be welded, a second switch means for coupling the output of said second source of electrical energy across the pieces of metal to be welded, and control means for initiating operation of the said first and second electrical switches to cause the output of said second source of electrical energy to be coupled across the pieces of metal to be welded a predetermined time after the output of said first source of electrical energy has been coupled to the pieces of metal to be welded, said control means being responsive to the spacing between the edges of said metal pieces to be welded to couple the output of said first source of electrical energy across the pieces of metal to be welded.

13. The combination of claim 12 where said first and second switch means are electronic switches, and said control means includes means for generating respective steep wave-front pulses for accurately triggering said first and second electronic switches and means for varying the phase between said pulses.

14. A method of percussion welding which comprises moving two work pieces to be welded toward each other, initiating ionization of the gas between the work pieces when said work pieces have reached a predetermined distance between them in the course of their approach toward each other, and thereafter impressing an arc generating potential across said work pieces a predetermined time after the initiation of said ionizing means so that ionization occurs at a predetermined time before arc discharge and so that arc discharge may be accurately started at a predetermined distance before the work pieces come together.

References Cited in the file of this patent

UNITED STATES PATENTS

| | | |
|---|---|---|
| 1,196,744 | Chubb I | Aug. 29, 1916 |
| 1,373,054 | Chubb II | Mar. 29, 1921 |
| 2,159,916 | Vang | May 23, 1939 |
| 2,235,385 | Rava | Mar. 18, 1941 |